(12) United States Patent
Khamis

(10) Patent No.: US 6,642,842 B1
(45) Date of Patent: Nov. 4, 2003

(54) VEHICLE REAR SAFETY LIGHT ASSEMBLY

(76) Inventor: Ed A. Khamis, 2302 Bianco Ter., Glenview, IL (US) 60025

( * ) Notice: Subject to any disclaimer, the term of this patent is extended or adjusted under 35 U.S.C. 154(b) by 0 days.

(21) Appl. No.: 10/056,544

(22) Filed: Jan. 25, 2002

(51) Int. Cl.7 .................................................. B60Q 1/50
(52) U.S. Cl. ........................ 340/467; 340/464; 340/466; 340/463; 340/479; 362/459; 362/540; 362/541; 362/549
(58) Field of Search ............................... 340/464, 467, 340/466, 479, 463; 362/459, 487, 540, 541, 542, 545, 549

(56) References Cited

U.S. PATENT DOCUMENTS

| | | | | |
|---|---|---|---|---|
| 3,676,844 A | * | 7/1972 | Hendrickson | 340/467 |
| 3,774,152 A | | 11/1973 | Tandy | |
| 3,846,748 A | * | 11/1974 | Hopwood | 340/467 |
| 4,808,968 A | | 2/1989 | Caine | |
| 4,970,493 A | * | 11/1990 | Yim | 340/468 |
| 4,994,786 A | * | 2/1991 | Schaffer | 340/478 |
| 5,097,251 A | | 3/1992 | Ketcham | |
| 5,663,707 A | | 9/1997 | Bartilucci | |
| 5,818,332 A | | 10/1998 | Chen | |
| D407,168 S | | 3/1999 | Arakelian | |
| 6,326,888 B1 | * | 12/2001 | Wang | 340/463 |

* cited by examiner

Primary Examiner—Benjamin C. Lee
Assistant Examiner—Lam Pham

(57) ABSTRACT

A vehicle rear safety light assembly for preventing rear end collisions by giving drivers warning of actions being taken by the user. The vehicle rear safety light assembly includes a transparent housing being adapted to mount to a vehicle; and also includes a first light-emitting member being disposed in the housing and being adapted to be connected to a power source; and further includes a second light-emitting member also being disposed in the housing and also being adapted to be connected to a power source; and also includes a sensor being adapted to be attached to a transmission of the vehicle and being connected to the first and second light-emitting members.

5 Claims, 3 Drawing Sheets

VEHICLE REAR SAFETY LIGHT ASSEMBLY

BACKGROUND OF THE INVENTION

1. Field of the Invention

The present invention relates to vehicle motion-identifying lights and more particularly pertains to a new vehicle rear safety light assembly for preventing rear end collisions by giving drivers warning of actions being taken by the user.

2. Description of the Prior Art

The use of vehicle motion-identifying lights is known in the prior art. More specifically, vehicle motion-identifying lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,663,707; U.S. Pat. No. 5,818,332; U.S. Pat. No. 4,808,968; U.S. Pat. No. 5,097,251; U.S. Pat. No. 3,774,152; and U.S. Pat. No. Des. 407,168.

While these devices fulfill their respective, particular objectives and requirements, the aforementioned patents do not disclose a new vehicle rear safety light assembly. The inventive device includes a transparent housing being adapted to mount to a vehicle; and also includes a first light-emitting member being disposed in the housing and being adapted to be connected to a power source; and further includes a second light-emitting member also being disposed in the housing and also being adapted to be connected to a power source; and also includes a sensor being adapted to be attached to a transmission of the vehicle and being connected to the first and second light-emitting members.

In these respects, the vehicle rear safety light assembly according to the present invention substantially departs from the conventional concepts and designs of the prior art, and in so doing provides an apparatus primarily developed for the purpose of preventing rear end collisions by giving drivers warning of actions being taken by the user.

SUMMARY OF THE INVENTION

In view of the foregoing disadvantages inherent in the known types of vehicle motion-identifying lights now present in the prior art, the present invention provides a new vehicle rear safety light assembly construction wherein the same can be utilized for preventing rear end collisions by giving drivers warning of actions being taken by the user.

The general purpose of the present invention, which will be described subsequently in greater detail, is to provide a new vehicle rear safety light assembly which has many of the advantages of the vehicle motion-identifying lights mentioned heretofore and many novel features that result in a new vehicle rear safety light assembly which is not anticipated, rendered obvious, suggested, or even implied by any of the prior art vehicle motion-identifying lights, either alone or in any combination thereof.

To attain this, the present invention generally comprises a transparent housing being adapted to mount to a vehicle; and also includes a first light-emitting member being disposed in the housing and being adapted to be connected to a power source; and further includes a second light-emitting member also being disposed in the housing and also being adapted to be connected to a power source; and also includes a sensor being adapted to be attached to a transmission of the vehicle and being connected to the first and second light-emitting members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle rear safety light assembly which has many of the advantages of the vehicle motion-identifying lights mentioned heretofore and many novel features that result in a new vehicle rear safety light assembly which is not anticipated, rendered obvious, suggested, or even implied by any of the prior art vehicle motion-identifying lights, either alone or in any combination thereof.

It is another object of the present invention to provide a new vehicle rear safety light assembly which may be easily and efficiently manufactured and marketed.

It is a further object of the present invention to provide a new vehicle rear safety light assembly which is of a durable and reliable construction.

An even further object of the present invention is to provide a new vehicle rear safety light assembly which is susceptible of a low cost of manufacture with regard to both materials and labor, and which accordingly is then susceptible of low prices of sale to the consuming public, thereby making such vehicle rear safety light assembly economically available to the buying public.

Still yet another object of the present invention is to provide a new vehicle rear safety light assembly which provides in the apparatuses and methods of the prior art some of the advantages thereof, while simultaneously overcoming some of the disadvantages normally associated therewith.

Still another object of the present invention is to provide a new vehicle rear safety light assembly for preventing rear end collisions by giving drivers warning of actions being taken by the user.

Yet another object of the present invention is to provide a new vehicle rear safety light assembly which includes a transparent housing being adapted to mount to a vehicle; and also includes a first light-emitting member being disposed in the housing and being adapted to be connected to a power source; and further includes a second light-emitting member also being disposed in the housing and also being adapted to be connected to a power source; and also includes a sensor being adapted to be attached to a transmission of the vehicle and being connected to the first and second light-emitting members.

Still yet another object of the present invention is to provide a new vehicle rear safety light assembly that is easy and convenient to install and use.

Even still another object of the present invention is to provide a new vehicle rear safety light assembly that gives following drivers heads up on the actions being taken by the leading driver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
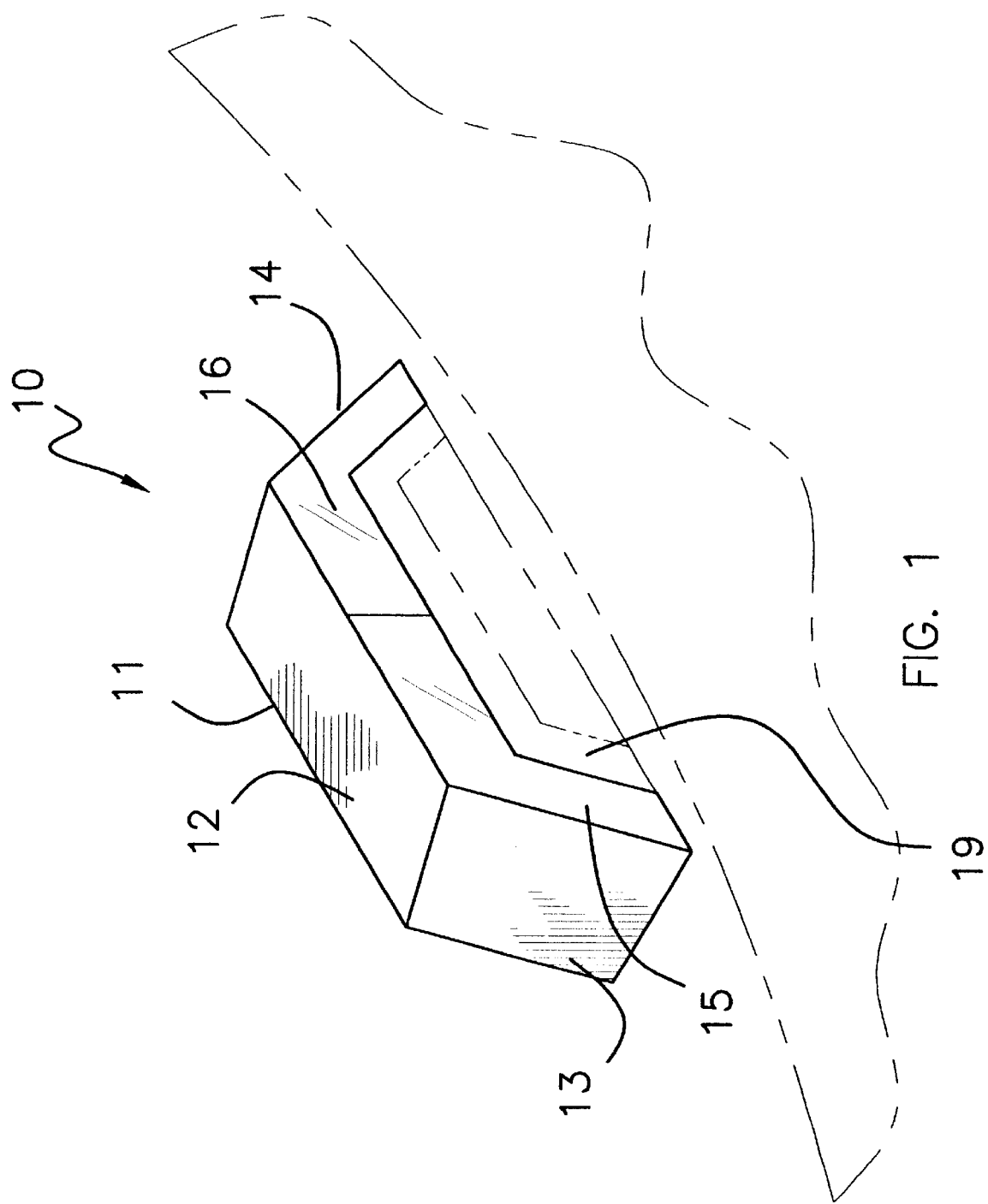
FIG. 1 is a perspective view of the housing of a new vehicle rear safety light assembly according to the present invention.
Figure 2:
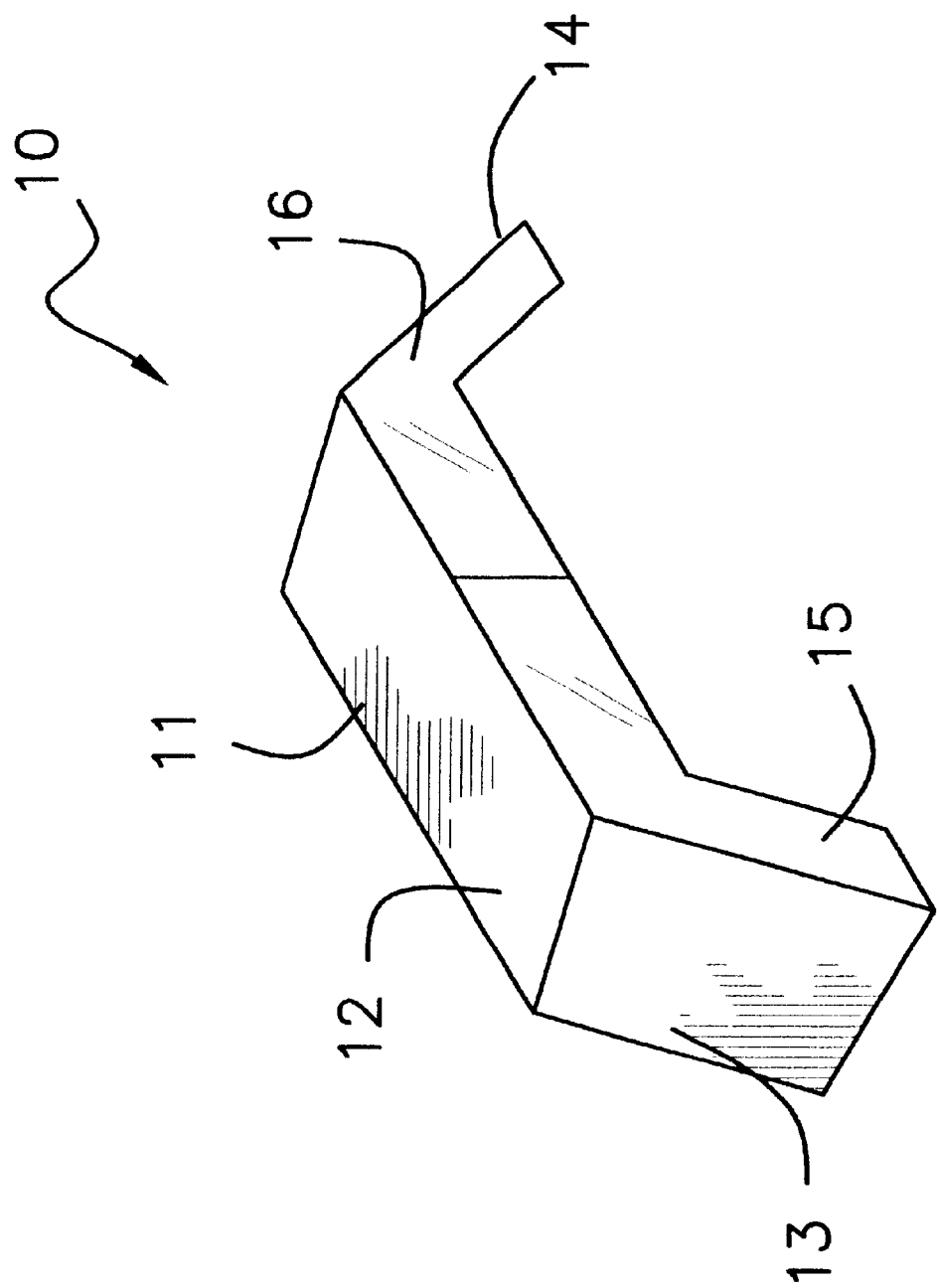
FIG. 2 is another perspective view of the housing of the present invention.
Figure 3:
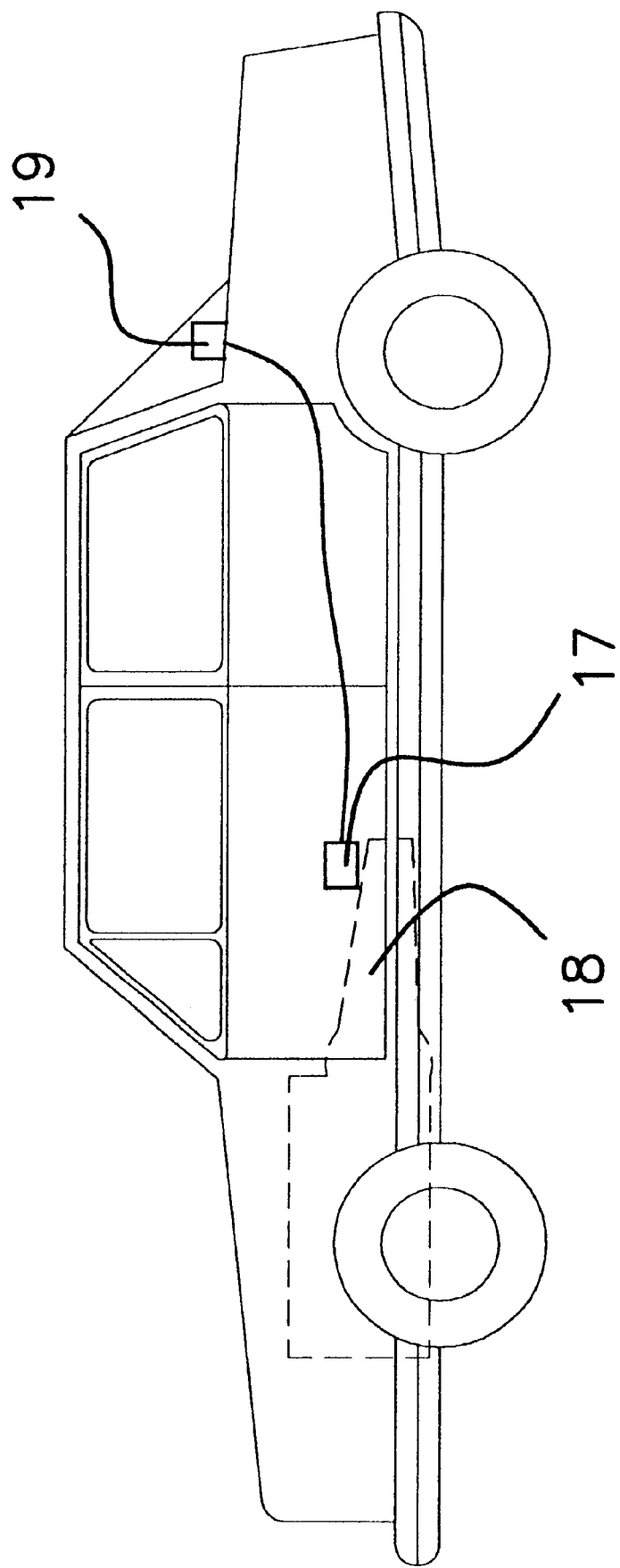
FIG. 3 is a perspective view of the sensor of the present invention.

With reference now to the drawings, and in particular to FIGS. 1 through 3 thereof, a new vehicle rear safety light assembly embodying the principles and concepts of the present invention and generally designated by the reference numeral 10 will be described.

As best illustrated in FIGS. 1 through 3, the vehicle rear safety light assembly 10 generally comprises a transparent housing 11 being adapted to mount to a vehicle. The transparent housing 11 is adapted to mount about a third brake light 19 of the vehicle and is curved and has a main portion 12 and wing portions 13,14 being angled relative to the main portion 12 with the transparent housing 11 being generally narrow. A first light-emitting member 15 is conventionally disposed in the housing 11 and is adapted to be connected to a power source with the first light-emitting member 15 being a green light-emitting member. A second light-emitting member 16 is also conventionally disposed in the housing 11 and also is adapted to be connected to a power source with the second light-emitting member 16 being a yellowish light-emitting member.

A sensor 17 is adapted to be conventionally attached to a transmission 18 of the vehicle and is conventionally connected to the first and second light-emitting members 15,16. The sensor 17 is adapted to detect actuation of the transmission 18 of the vehicle and is also adapted to detect non-actuation of the transmission 18 of the vehicle. The sensor 17 energizes the green light-emitting member 15 upon actuation of the transmission 18 and energizes the yellowish light-emitting member 16 upon non-actuation of the transmission 18.

In use, when the user depresses the gas pedal to actuate the transmission 18, the green light-emitting member 15 is energized and lit for the following motorists to see, and when the user lets up on the gas pedal to non-actuate the transmission 18, the yellowish light-emitting member 16 is energized and lit for the following motorists to see what action the user has taken while driving the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle rear safety light assembly comprising:

a transparent housing being adapted to mount to a vehicle;

a first light-emitting member being disposed in said housing and being adapted to be connected to a power source;

a second light-emitting member also being disposed in said housing and also being adapted to connected to a power source;

a sensor being adapted to be attached to a transmission of the vehicle and is connected to said first and second light-emitting members; and said transparent housing being adapted to mount about a third brake light of the vehicle, said transparent housing comprising a main portion and wing portions, said main portion comprising a pair of side portions, each of said wing portions being coupled to one of said side portions of said main portion such that each of said wing portions angles outwardly from the associated one of said side portions of said main portion, each of said wing portions being adapted for being positioned on opposite sides of the third brake light such that said main portion is positioned above the third brake light for drawing attention to said first light-emitting member and said second light-emitting member, said first light emitting member being disposed in one of side portions of said main portion and the associated one of said wing portions such that said second light-emitting member is disposed in the other of said side portions of said main portion and the associated one of said wing portions, said transparent housing being generally narrow.

2. A vehicle rear safety light assembly as described in claim 1, wherein said first light-emitting member is a green light-emitting member.

3. A vehicle rear safety light assembly as described in claim 2, wherein said second light-emitting member is a yellowish light-emitting member.

4. A vehicle rear safety light assembly as described in claim 3, wherein said sensor is adapted to detect actuation of the transmission of the vehicle and is also adapted to detect non-actuation of the transmission of the vehicle, said sensor energizing said green light-emitting member upon actuation of the transmission and energizing said yellowish light-emitting member upon non-actuation of the transmission.

5. A vehicle rear safety light assembly comprising:

a transparent housing being adapted to mount to a vehicle, said transparent housing being adapted adapted to mount about a third brake light of the vehicle, said transparent housing comprising a main portion and wing portions, said main portion comprising a pair of side portions, each of said wing portions being coupled to one of said side portions of said main portion such that each of said win portions angles outwardly from the associated one of said side portions of said main portion, each of said wing portions being adapted for being positioned on opposite sides of the third brake light such that said main portion is positioned above the third brake light for drawing attention to a first light-emitting member and a second light-emitting member, said first light emitting member being disposed in one of side portions of said main portion and the associated one of said wing portions such that said second light-emitting member is disposed in the other of said side portions of said main portion and the associated one of said wing portions, said transparent housing being generally narrow;

said first light-emitting member being disposed in said housing and being adapted to be connected to a power source, said first light-emitting member being a green light-emitting member;

said second light-emitting member also being disposed in said housing and also being adapted to connected to a power source, said second light-emitting member being a yellowish light-emitting member; and a sensor being adapted to be attached to a transmission of the vehicle and is connected to said first and second light-emitting members, said sensor being adapted to detect actuation of the transmission of the vehicle and being also adapted to detect non-actuation of the transmission of the vehicle, said sensor energizing said green light-emitting member upon actuation of the transmission and energizing said yellowish light-emitting member upon non-actuation of the transmission.

* * * * *